(12) United States Patent
Lynggaard (10) Patent No.: US 7,296,075 B2
(45) Date of Patent: Nov. 13, 2007

(54) METHOD, APPARATUS AND SYSTEM FOR CONNECTING A PORTABLE UNIT TO A PARTICULAR SERVER UNIT FROM AMONG A PLURALITY OF SERVER UNITS

(75) Inventor: Stefan Lynggaard, Lund (SE)

(73) Assignee: Anoto AB, Lund (SE)

( * ) Notice: Subject to any disclaimer, the term of this patent is extended or adjusted under 35 U.S.C. 154(b) by 762 days.

(21) Appl. No.: 10/226,112

(22) Filed: Aug. 23, 2002

(65) Prior Publication Data

US 2003/0055986 A1 Mar. 20, 2003

Related U.S. Application Data

(60) Provisional application No. 60/316,032, filed on Aug. 31, 2001.

(30) Foreign Application Priority Data

Aug. 23, 2001 (SE) ..................... 0102802

(51) Int. Cl.
*G06F 15/16* (2006.01)
(52) U.S. Cl. ............... 709/227; 709/217; 709/218; 709/219; 709/228; 709/229; 709/203; 345/173; 345/179
(58) Field of Classification Search ........ 709/217–219, 709/227–229, 203; 345/173, 179
See application file for complete search history.

(56) References Cited

U.S. PATENT DOCUMENTS

| | | | |
|---|---|---|---|
| 5,477,012 A | 12/1995 | Sekendur | |
| 5,768,531 A | 6/1998 | Lin | |
| 5,852,434 A * | 12/1998 | Sekendur | 345/179 |
| 6,330,976 B1 * | 12/2001 | Dymetman et al. | 235/487 |
| 6,795,688 B1 * | 9/2004 | Plasson et al. | 455/41.2 |
| 6,842,460 B1 * | 1/2005 | Olkkonen et al. | 370/465 |
| 6,878,062 B2 * | 4/2005 | Bjorklund et al. | 463/17 |
| 6,954,790 B2 * | 10/2005 | Forslow | 709/227 |
| 6,966,495 B2 * | 11/2005 | Lynggaard et al. | 235/472.01 |
| 6,980,083 B2 * | 12/2005 | Sako et al. | 340/7.52 |
| 6,985,697 B2 * | 1/2006 | Smith et al. | 455/41.2 |
| 7,063,263 B2 * | 6/2006 | Swartz et al. | 235/472.02 |

(Continued)

FOREIGN PATENT DOCUMENTS

DE    10009147 A1    8/2001

(Continued)

*Primary Examiner*—David Wiley
*Assistant Examiner*—Alina N. Boutah
(74) *Attorney, Agent, or Firm*—Birch, Stewart, Kolasch & Birch, LLP (57) ABSTRACT

The present invention relates to a method for connecting a portable unit (1) to a particular server unit from among a plurality of server units (5, 6, 7 and 8). The portable unit (1) comprises a first address list and the particular server unit comprises a second address list. The first and the second address lists comprise the attribute of at least one server unit and the address of this server unit. The method comprises the steps of updating the second address list from the first address list and updating the first address list from the second address list. The invention also relates to a server unit and a portable unit.

13 Claims, 5 Drawing Sheets

U.S. PATENT DOCUMENTS

| | | | |
|---|---|---|---|
| 7,094,977 B2 * | 8/2006 | Ericson et al. | 178/18.01 |
| 7,134,606 B2 * | 11/2006 | Chou | 235/494 |
| 2001/0038383 A1 * | 11/2001 | Ericson et al. | 345/173 |
| 2002/0035699 A1 * | 3/2002 | Crosbie | 713/201 |
| 2002/0095333 A1 * | 7/2002 | Jokinen et al. | 705/14 |
| 2003/0016651 A1 * | 1/2003 | Kwok et al. | 370/349 |
| 2003/0087650 A1 * | 5/2003 | Aarnio | 455/456 |
| 2004/0171379 A1 * | 9/2004 | Cabrera et al. | 455/422.1 |

FOREIGN PATENT DOCUMENTS

| | | |
|---|---|---|
| WO | WO 99/50751 A1 | 10/1999 |
| WO | WO 00/39967 A2 | 7/2000 |
| WO | WO 00/73983 A1 | 12/2000 |
| WO | WO 01/16691 A1 | 3/2001 |
| WO | WO 01/20572 A1 | 3/2001 |
| WO | WO 01/26032 A1 | 4/2001 |
| WO | WO 01/48685 A1 | 7/2001 |
| WO | WO 01/61452 A2 | 8/2001 |

* cited by examiner

| Attribute | Coordinate area | Address | Number of visits | Date/Time | Counter value upon UPDATING | Locality |
|---|---|---|---|---|---|---|
| Fast-food restaurant | (253, 297) (353, 397) | 0123456 789abc | 30 | 15.06.01/15:31 | 130 | 4 |

| 31 | 32 | 33 | 34 | 35 | 36 | 37 |

| Attribute | Coordinate area | Address | Number of visits | Date/Time | Locality | Counter value |
|---|---|---|---|---|---|---|
| Hamburger restaurant | (100, 200) (150, 250) | 23456789 abc01 | | | 30 | 230 |
| Pasta restaurant | (453, 493) (553, 600) | 3456789 abc012 | 5 | 17.06.01/13:00 | 30 | |
| Pizza restaurant | (600, 700) (650, 750) | 456789 abc0123 | 30 | 18.06.01/11:00 | 30 | |

| 41 | 42 | 43 | 44 | 45 | 46 | 47 |

40

| Attribute | Coordinate area | Address | Number of visits | Date/Time | Counter value upon UPDATING | Locality |
|---|---|---|---|---|---|---|
| Fast-food restaurant | (253,297) (353,397) | 0123456789abc | 30 | 15.05.01/15:31 | 130 | 4 |
| Hamburger restaurant | (100,200) (150,250) | 23456789abc01 | 1 | 18.06.01/13:00 | 230 | 30 |
| Pasta restaurant | (453,493) (553,600) | 3456789abc012 | 0 | 18.06.01/13:00 | 0 | 30 |
| Pizza restaurant | (600,700) (650,750) | 456789abc0123 | 0 | 18.06.01/13:00 | 0 | 30 |
|  |  |  |  |  |  |  |

Fig. 5

| Attribute | Coordinate area | Address | Number of visits | Date/Time | Locality | Counter value |
|---|---|---|---|---|---|---|
| Pizza restaurant | (600,700) (650,750) | 456789abc123 |  |  | 30 | 250 |
| Pasta restaurant | (453,493) (553,600) | 3456789abc12 | 15 | 19.06.01/8:00 | 30 |  |
| Chinese restaurant | (800,900) (900,950) | 56789abc1234 | 17 | 19.06.01/9:00 | 30 |  |
|  |  |  |  |  |  |  |

METHOD, APPARATUS AND SYSTEM FOR CONNECTING A PORTABLE UNIT TO A PARTICULAR SERVER UNIT FROM AMONG A PLURALITY OF SERVER UNITS

This application claims priority on provisional Application No. 60/316,032 filed on Aug. 31, 2001, the entire contents of which are hereby incorporated by reference.

FIELD OF THE INVENTION

The present invention relates to methods for connecting a portable unit to a particular server unit, a system which allows such connection, and also a server unit and a portable unit.

BACKGROUND TO THE INVENTION

In order for different units in a local environment to be able to exchange information, there are at present a number of different technologies that make possible short-range communication. One example of such short-range communication is radio communication according to the Bluetooth® standard or the WLAN standard.

Units adapted to such short-range communication include such portable user units as mobile telephones, portable computers and PDAs, as well as the pen-shaped sensor device described in the Applicant's Patent Applications WO 01/16691 and WO 01/48685, which are herewith incorporated by reference.

These user units can be operated for direct connection, via short-range communication, to a server unit with a particular attribute/service. In order for a user unit to be able to connect to the particular server unit, it needs, however, to know the address thereof for short-range communication.

The user unit can only store a limited number of addresses, which in general makes impossible the storage of addresses of all the server units. Since it is desirable to be able to use the user unit in different local environments, such as in different towns or countries, it is in general also impossible to permanently store in advance a relevant subset of the addresses of all server units in a memory of the user unit.

A conceivable way of tackling this problem would instead be to utilize a linear search method, in which the user unit is caused to implement a series of connection attempts to every possible address. Such a method, however, will be undesirably time-consuming.

Another alternative solution could be that, at a request from a user unit, each server unit is able to implement a search within, or forward the request to, other server units in its vicinity for a desired attribute/service. However, with short-range communication, the range is in general insufficient for such a distributed search, that is the server units are located at a distance that makes it impossible for them to communicate with each other.

Alternatively, the user unit, or a server unit contacted by the user unit, could via a communication network implement a look-up in a central database holding associations between attributes/services and addresses for short-range communication. Such a solution can be hampered by slow connection to the central database. In addition, the central database must be constructed and maintained, which is costly.

An additional possible solution, in the following called the enquiry method, could be to let the user unit intermittently transmit an enquiry signal that causes other units in the vicinity to return their address, whereby the user unit can build up an internal database of addresses of units that are within its radius of communication. Such a technique can, however, be time-consuming if there are many units in the vicinity, particularly if it is desirable for connection to be carried out to one specific unit. Another problem with this method is that it does not always lead to the correct unit being found, due to an incorrect unit being selected or due to all units within reach not being available to answer enquiries. For instance, the Bluetooth standard allows only that a limited number of units communicate with each other, within a so-called pico-network, that is created when several units are in the same local environment.

Another possible method for specifying an address for communication is to enter the address of the specific unit manually. This method is, even more than the method above, associated with slow entering and sources of error, such as incorrect entry by the user. In addition, it is necessary for a user-interface to be available in order for the entry to be carried out.

SUMMARY OF THE INVENTION

An object of the present invention is therefore to provide a method that makes possible more efficient connection of a portable unit to different server units. The solution is based on the idea of associating an attribute of an individual server unit with an address of the same and of storing this in a data structure in the portable unit (the client) and in each server unit. These data structures thus comprise attributes and associated addresses. The data structures act conveniently in a similar way to a cache memory, that is the attributes that occur often are stored.

According to a first aspect of the present invention, this comprises a method for connecting a portable unit to a particular server unit from among a plurality of server units, the portable unit comprising a first address list and the particular server unit comprising a second address list, the first and the second address list comprising the attribute of at least one server unit and the address of this server unit, comprising the steps of updating the second address list from the first address list, and updating the first address list from the second address list.

The fact that a server unit has a particular attribute can, for example, mean that the server unit belongs to a particular business or a particular company, or that the server unit can provide a particular service. The attribute can also be that the server unit has the function of, for example, being a printer, fax machine or computer.

As the portable unit updates its address list from the server unit's address list, the portable unit builds up an address list with relevant addresses of particular server units, which will very probably be addresses that will be requested in the vicinity of the portable unit.

After the server unit has been in use for some time, that is has been connected to portable units that were active in the local environment, the server unit's address list will very probably contain the addresses of most of the server units in the locality as a result of the above method.

An advantage of this is that when the portable unit enters a new local environment, it will be updated quickly with addresses and attributes of available server units. When the portable unit wants to connect to another server unit with a given attribute in the same local environment, it is very probable that it has this address in its address list and that the connection can be carried out directly. This means that the connection is carried out quickly.

Another advantage of the method is that the power consumption is reduced, as a "search" for the correct unit is not required and as connection to unit after unit does not need to be carried out in order to find the server unit with the required attribute.

A further advantage of this method is that it is very probable that the portable unit will contain an address of a particular server unit that a user is looking for in a locality, in spite of the portable unit having a limited memory.

As it is very probable that the portable unit's memory contains an address of a required server unit, the load on the server unit is also reduced. This means that server units do not need to be fully occupied with answering enquiries from portable units that are looking for a particular server unit, which in turn reduces the risk that the portable unit cannot connect to the server unit due to the server unit not being able to receive any more connections.

In this connection, address list should be interpreted to intend every data structure suitable for storage of entries each containing at least one address field. Examples of sorted or unsorted data structures are linked lists, vectors, pointer structures, trees of arbitrary order, queues, stacks, hash tables, etc.

In an advantageous embodiment, the method further comprises the initial steps of recording a required attribute of a server unit, searching for the recorded attribute in the first address list and, if the recorded attribute is to be found in the first address list, connecting the portable unit to the required server unit via the address in the first address list that is associated with the recorded attribute.

The step of recording a required attribute can be carried out in various ways, such as, for example, by keying the attribute in manually or by voice control. The portable unit's address list is then searched to see whether the recorded attribute is stored here. If the attribute is found to be stored in the address list, there is an address associated with the attribute. This is the address of the required server unit. The portable unit can then connect to the required server unit directly. If the recorded attribute is not to be found in the address list, a linear searching method or an enquiry method can, for example, be carried out.

According to another advantageous embodiment of the invention, a required attribute is recorded by the user using the portable unit, on a base provided with a subset of a position-coding pattern which codes positions on an imaginary surface, recording electronically a pair of coordinates in a first partial area from among a plurality of partial areas on the imaginary surface, which partial area is associated with the required attribute.

According to this embodiment, an imaginary surface that is made up by all the positions that the position-coding pattern can code is thus divided into a plurality of partial areas. A partial area can consist of a coordinate area that can be any shape and is defined by the requisite number of pairs of coordinates. When a pair of coordinates has been recorded, the portable unit can, for example, identify to which partial area the pair of coordinates belongs and thereby identify the required attribute. Different partial areas may thus be associated with different attributes.

It must be pointed out that each position can be defined by more than two coordinates. For example, if there are several imaginary surfaces, a third coordinate can be used to define which imaginary surface is referred to. Thus, the term "pair or coordinates" according to the invention is to be interpreted as the set of a number of m coordinates which are necessary to determine a position of a point in an m dimensional coordinate system.

An advantage of recording the attribute according to this method is that it is simple for the user. Different partial areas on the position-coded base can, for example, be provided with different pictures or symbols that represent an attribute. This means that the user can record a required attribute quickly and easily.

The portable unit can be a digital pen or some other hand-held electronic device using which information can be recorded, for example a PDA with a pressure-sensitive screen or a mobile telephone.

In an advantageous embodiment of the method, the first address list comprises statistics of the number of connections to a server unit with a particular attribute.

It is desirable for the first address list to be limited in size so that searches in it can be carried out quickly. At the same time, it is also desirable for the address list to contain the attribute that the user of the portable unit is looking for. By keeping statistics in the portable unit's address list of how many connections have been carried out to a particular server unit, the server unit's address list can in this way contain the attributes that the user will most probably ask for.

According to an advantageous embodiment of the method, the second address list comprises statistics of the number of portable units that have been connected to the particular unit and that have had a server unit's attribute in their address list.

It is also desirable to be able to limit the size of the second address list, among other things in order that updating from a first address list can be carried out quickly. One way of limiting the size is to keep statistics of the number of units that have been connected to the particular unit and that have had the respective server unit's attribute in their address list and to remove attributes with the lowest number of occurrences. The address list has a limited storage capacity, and when the address list is full, addresses and associated attributes must be removed when new ones are to be added.

In one embodiment, the first address list comprises information about the time of the most recent connection to a server unit with a particular attribute.

This can advantageously be used to select which addresses and associated attributes are to be removed from the first address list in order that it does not become too long.

According to a second aspect of the invention, this relates to a system comprising at least one portable unit and a plurality of server units with unique addresses, the portable unit comprising a first address list and said plurality of server units each comprising a second address list, the first and the second address list comprising the attribute of at least one server unit and the address of this server unit, and means for updating the particular server unit's second address list from the first address list when the portable unit is connected to a particular server unit, and means for updating the first address list from the particular server unit's second address list when the portable unit is connected to the particular server unit.

The means are advantageously implemented as software that is stored in a memory and that can be executed by a processor in the portable unit and the particular server unit respectively.

According to a third aspect of the invention, this relates to a method for connecting a portable unit to a particular server unit with an address list that comprises the attribute of at least one server unit and the address of this server unit, comprising the steps of updating, in the particular server unit, its address list from an address list in the portable unit and, in the particular server unit, making it possible for the portable unit to obtain information from the particular server unit's address list.

According to a fourth aspect of the invention, this relates to a computer program which is stored in a memory medium that can be read by a computer and which comprises instructions for causing a computer to carry out the method according to the third aspect of the invention.

According to a fifth aspect of the invention, this relates to a server unit with an address list comprising the attribute of at least one other server unit and this server unit's address, means for updating the address list from a portable unit's address list and means for making it possible for the portable unit to obtain information from the server unit's address list.

Said means for updating the address list and said means for making it possible for the portable unit to obtain information are advantageously implemented as software, that is stored in a memory in the portable unit and can be executed by a processor in the same.

According to a sixth aspect of the invention, this relates to a portable unit comprising an address list that has the attribute of at least one server unit and the address of this server unit, means for connecting to a particular server unit, means for updating the address list from an address list in the particular server unit and means for making it possible for the particular server unit to obtain information from the portable unit's address list.

The means for updating and the means for making it possible for the particular server unit to obtain information are advantageously implemented as software.

The advantages of the second, third, fourth, fifth and sixth aspects are apparent from the discussions above.

BRIEF DESCRIPTION OF THE DRAWINGS

The invention will be described in greater detail below with reference to the accompanying schematic drawings which show for the purposes of exemplification the preferred embodiments of the invention.

DETAILED DESCRIPTION OF THE PREFERRED EMBODIMENT

Figure 1:
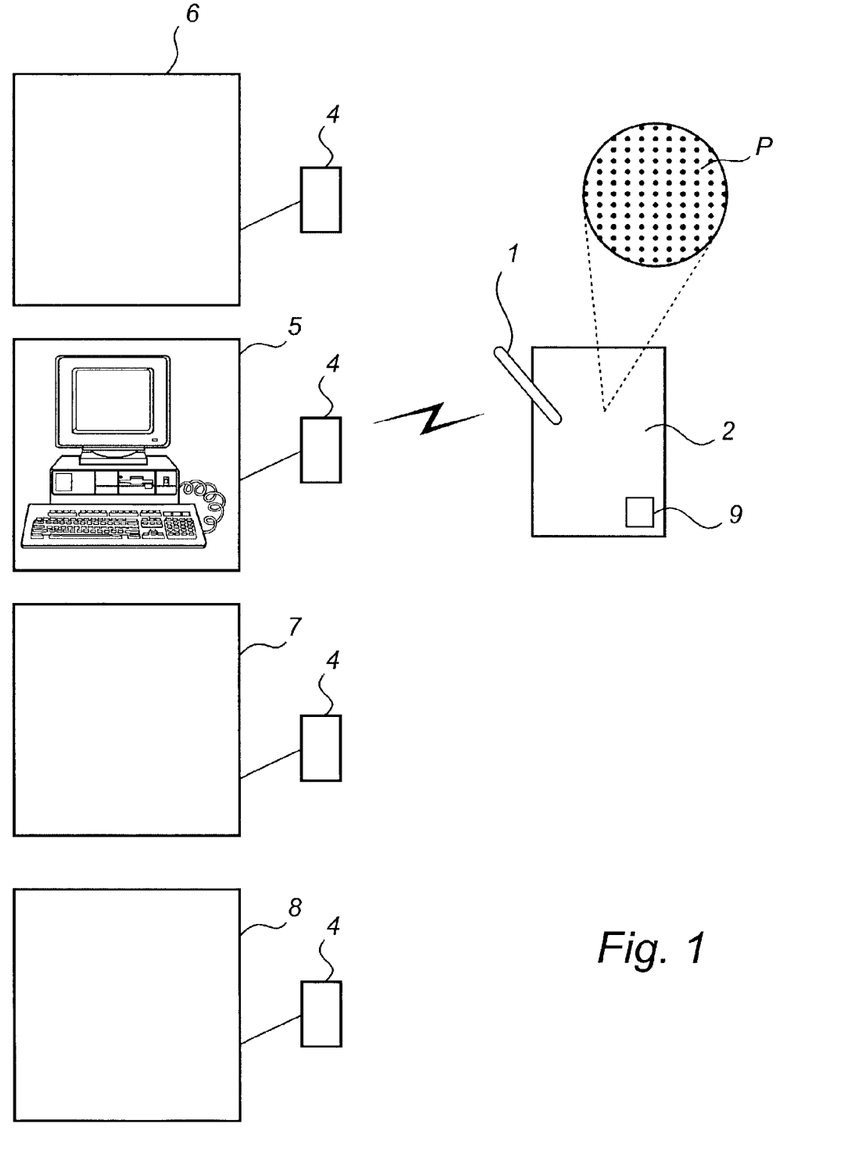
FIG. 1 shows a system in which the method according to the invention can advantageously be used.

The present invention will now be described with reference to preferred embodiments. In a first embodiment, the portable unit is a sensor device that will be described below. In this example, the attributes of the different server units are different restaurants. FIG. 1 shows schematically the system according to a preferred embodiment. The system comprises a sensor device 1 using which a user can record a special menu in a required restaurant from an order form 2 that represents different menus at the required restaurant. The system comprises, in addition, a number of restaurants, each of which has a server unit 5, 6, 7 and 8, that can process the orders. In FIG. 1, the server unit 5 belongs to a hamburger restaurant, the server unit 6 belongs to a pizza restaurant, the server unit 7 belongs to a Chinese restaurant and the server unit 8 belongs to a pasta restaurant.

An order form 2, consisting of a base—normally a sheet of paper—on which a number of options are presented, is provided with areas 9 intended to be marked by a person placing an order. According to the preferred embodiment of the invention, each such area is provided with a partial area of an imaginary surface, on which coordinates are coded by a position-coding pattern P. By reading the position-coding pattern, orders are digitized, which is carried out by a person using a sensor device 1 as described below.

The position-coding pattern P is shown only schematically in FIG. 1 as a surface provided with dots. This position-coding pattern is used to record in electronic form what is written on the base. Different types of position-coding pattern, that can be used for this purpose, are previously known. For example, U.S. Pat. No. 5,477,012 shows a position-coding pattern where each position is coded by a unique symbol. The position-coding pattern can be read using a pen, which detects the position code optically, decodes this and generates pairs of coordinates which describe the movement of the pen across the surface. In WO 00/73983 and WO 01/26032, which are both assigned to the Applicant of the present application and are incorporated herein by reference, other position-coding patterns are described, where each position is coded using a plurality of symbols of a simpler type and where each symbol contributes to the coding of more than one position. In WO 00/73983, different sized dots are used to code ones and zeros in the position-coding pattern, which is binary. In WO 01/26032, four different displacements of a dot from a nominal position are used to code four different bit pairs in the position-coding pattern. A certain number of dots, for example 6*6 dots, codes a unique position. The position can be calculated from the bit values corresponding to the dots.

The position-coding patterns in WO 00/73983 and WO 01/26032 can be detected optically using a pen that decodes the dots and generates a pair of coordinates for each set of, for example, 6*6 dots. If the position-coding pattern is read while the pen is writing on the position-coding pattern, a sequence of pairs of coordinates is thus obtained, which sequence describes the movement of the pen across the position-coding pattern and thus constitutes an electronic representation of what is being written on the paper.

In the following, it is assumed that the base 2 is provided with a position-coding pattern of the type that is described in WO 01/26032.

Each restaurant is allocated its own unique pattern on the order form. The restaurant can then itself divide the unique pattern into a number of partial areas that can be associated with a particular menu for precisely that restaurant. The information about this division can be stored locally in the restaurant's own server unit.

The sensor device 1 can be a type as described in WO 01/26032. An example of the construction of such a device is described in the following with reference to FIG. 2.

Figure 2:
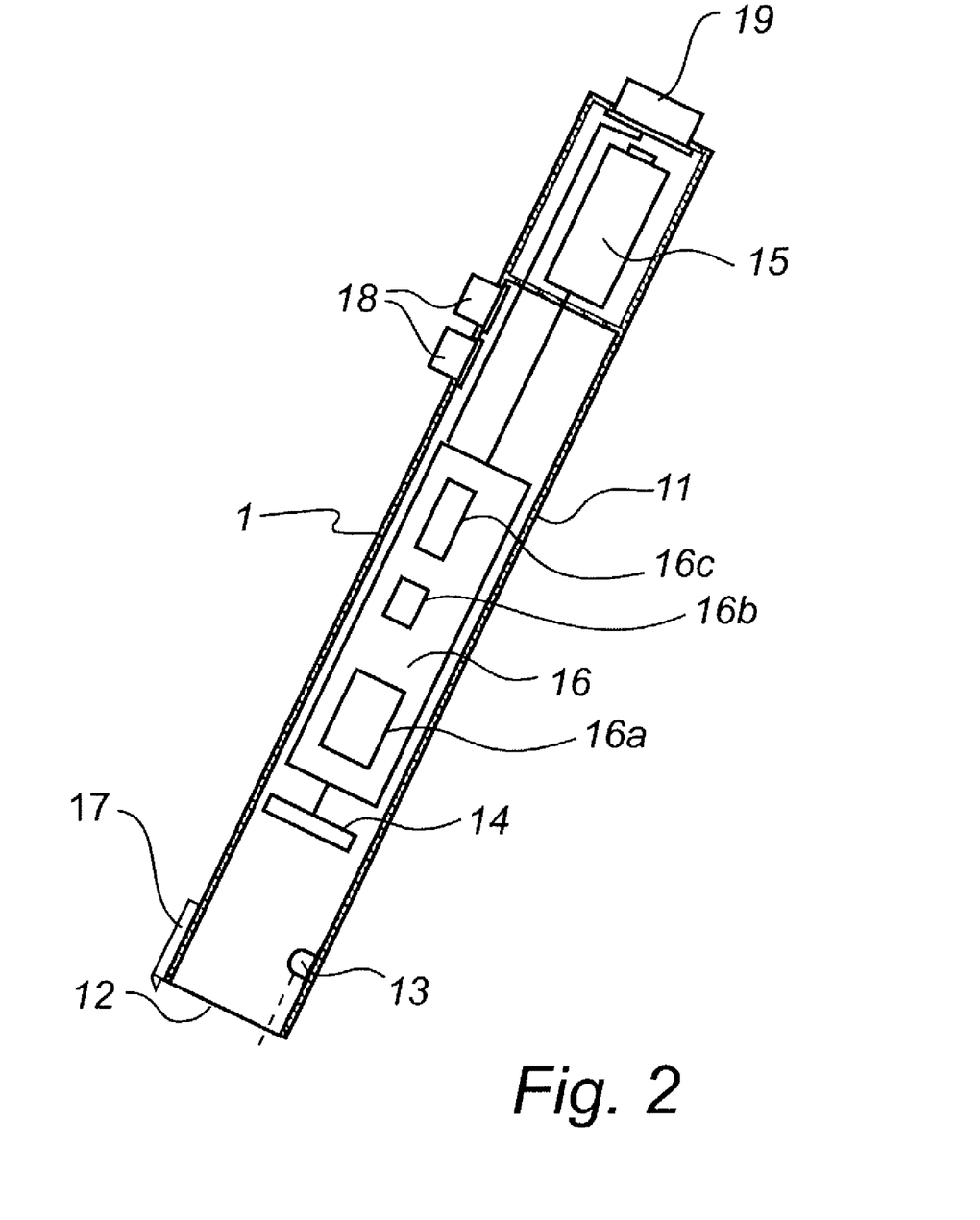
FIG. 2 shows a portable unit according to an embodiment of the invention.

The sensor device 1 comprises a casing 11 which is approximately the same shape as a pen. In one short side of the casing, there is an opening 12. The short side is intended to abut against or to be held a short distance from the surface on which the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. If required, the device can also contain an optical system, such as a mirror and/or lens system (not shown). The light-emitting diode can be an infrared light-emitting diode and the sensor can be sensitive to infrared light.

The power supply for the device is obtained from a battery 15, which is mounted in a separate compartment in the casing. It is also possible to provide the power supply via a cable from an external power source (not shown).

The electronic circuitry part contains a signal-processor 16 which comprises a processor 16a with a working memory 16b and a program memory 16c. The processor 16a is programmed to read images from the sensor, to detect the position-coding pattern in the images and to decode this into positions in the form of pairs of coordinates, and to process the information thus recorded in electronic form in the way that will be described in greater detail below.

In this embodiment, the device also comprises a pen point 17, by means of which ordinary pigment-based writing can be written on the surface on which the position determination is to be carried out. The pen point 17 can be extendable and retractable so that the user can control whether or not it is to be used. In certain applications the device does not need to have a pen point at all.

The pigment-based writing is suitably of such a type that it is transparent to infrared light and the position-coding pattern suitably absorbs infrared light. By using a light-emitting diode which emits infrared light and a sensor which is sensitive to infrared light, the detection of the pattern can be carried out without the above-mentioned writing interfering with the pattern.

In addition, the device can comprise buttons 18, by means of which the device can be activated and controlled. It can also have a transceiver 19 for wireless transmission, for example using infrared light, radio waves or ultrasound, of information to and from the device. The device can also be arranged to transmit the information by wireless means to a network connection unit, which in turn transmits the information by wireless means to a server unit. The network connection unit can, for example, be a mobile telephone or a PDA (Personal Digital Assistant). The device can also comprise a display (not shown) for displaying positions or recorded information.

The device can be divided between different physical casings, a first casing containing components which are required for recording images of the position-coding pattern and for transmitting these to components which are contained in a second casing and which carry out the position determination on the basis of the recorded image(s).

Figure 3:
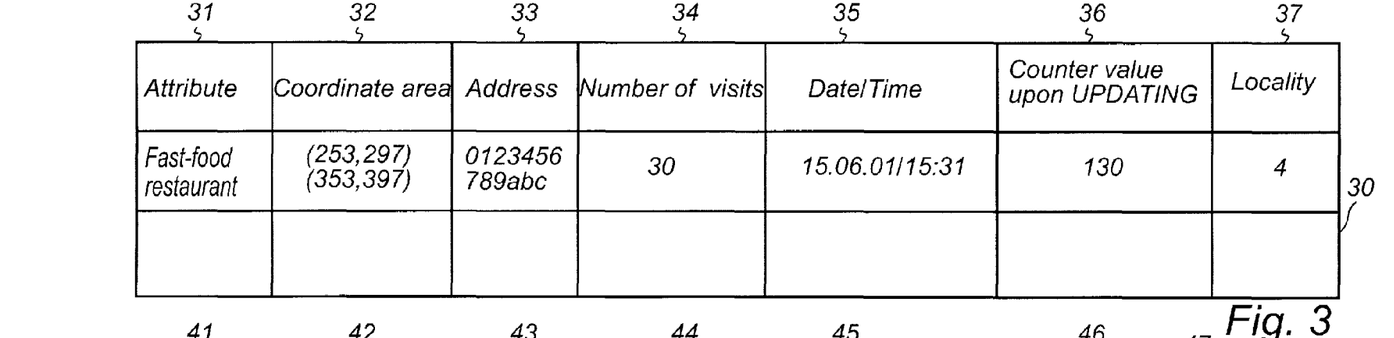
FIG. 3 shows schematically the data structure of a first address list in the portable unit.

The sensor device 1 comprises in addition a first address list which, for example, can appear as shown in FIG. 3 and which is stored in the memory in 16b and/or 16c. If the communication takes place via a network connection unit, for example a mobile telephone, it is possible to store the first address list in the network connection unit instead of in the sensor device. The address list 30 comprises a "help" column 31 which is only included for the purpose of illustration and in order to make it easier for the reader to understand. This column comprises the attribute that is associated with a particular coordinate area. The address list has a first column 32 for a rectangular coordinate area that is defined by two diagonal pairs of coordinates. This coordinate area is associated with a particular attribute, which can be a particular restaurant. In addition, the address list has a second column 33, which comprises the address of the server unit for the particular restaurant with the particular attribute represented by the coordinate area. In the third column 34 of the first address list, there are statistics of how many times the sensor device has been connected to the particular server unit. In the fourth column 35, there is the date and time of the most recent connection to the server unit with the attribute in question, or, if the server unit with the attribute in question has never been visited, the date and time when the attribute entered the address list.

In the fifth column 36, information is stored concerning the value that the server unit's counter had when updating from this server unit was carried out at the time of a previous connection to this server unit. If there has not been any updating from this server unit, this value can be 0.

In a sixth column 37, information is stored about the locality of the server unit. In this embodiment, the locality is given by a number that corresponds to a particular area.

As the storage capacity of the first address list is limited, it can become full. If this occurs and an updating with a new attribute is required, one or more attributes (the corresponding rows in FIG. 3) are removed from the address list. For example, those attributes can be removed that represent server units to which the sensor device has been connected the least number of times and/or the attributes that were added or visited furthest back in time.

The locality can also be important when it is a matter of deciding which attributes are to be removed from the address list. If a portable unit is used often in a particular local environment, these addresses should be saved as they will very probably soon be used again. If the sensor device is connected to a mobile telephone, the locality can, for example, be determined based on the cell in the mobile telephone network in which the mobile telephone is located or based on an output signal from a positioning unit (not shown), such as a GPS receiver, in the sensor device or mobile telephone.

The address list can also have certain attributes that are not removed. These can be attributes that are in a particular environment and that should remain stored even if the sensor device does not make a connection to them for a period of time. For example, if an employee obtains his sensor device from his company and the company's units are stored in the address list, it can be desirable for these to remain in the sensor device even if the employee goes on holiday for a few weeks and uses the sensor device in other environments.

Figure 7:
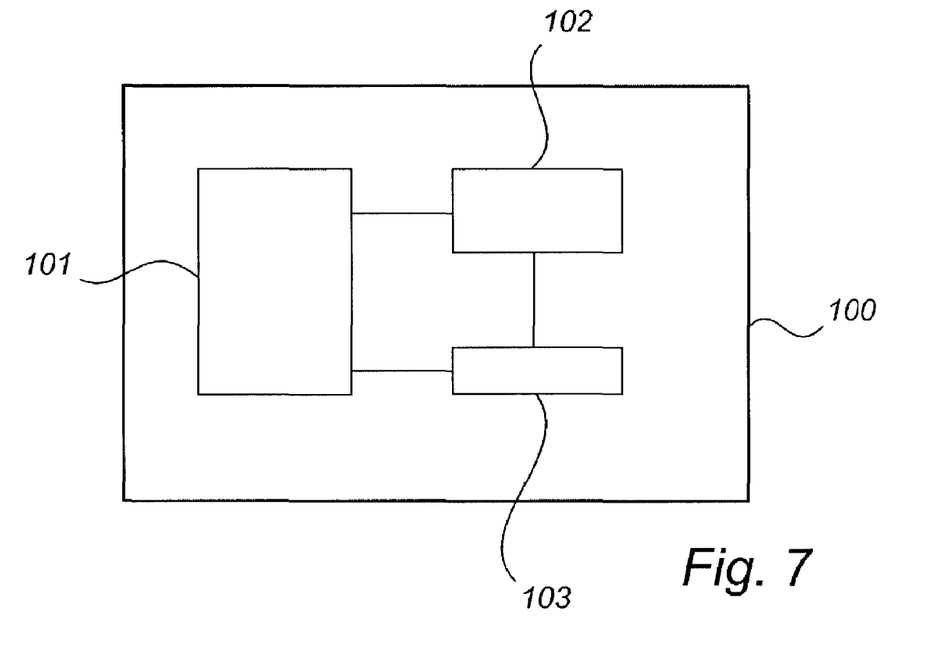
FIG. 7 shows a block diagram of a server unit according to the present invention.

The server unit can, for example, be an ordinary computer that belongs to the required restaurant. FIG. 7 shows a block diagram of a server unit 100 that represents the server units 5, 6, 7 and 8 in this embodiment. The server unit comprises a processor 101 with a working memory 102, such as a RAM, and a program memory 103, that is a permanent memory such as, for example, a hard disk. The method described above is advantageously realized as software that is stored in the program memory 103 and that, when executed, is read from the program memory 103 into the working memory 102 by the processor 101. The processor 101 is thus programmed to update the server unit's address list from the address list of the sensor device and to make it possible for the sensor device to obtain information from the server unit's address list.

Figure 4:
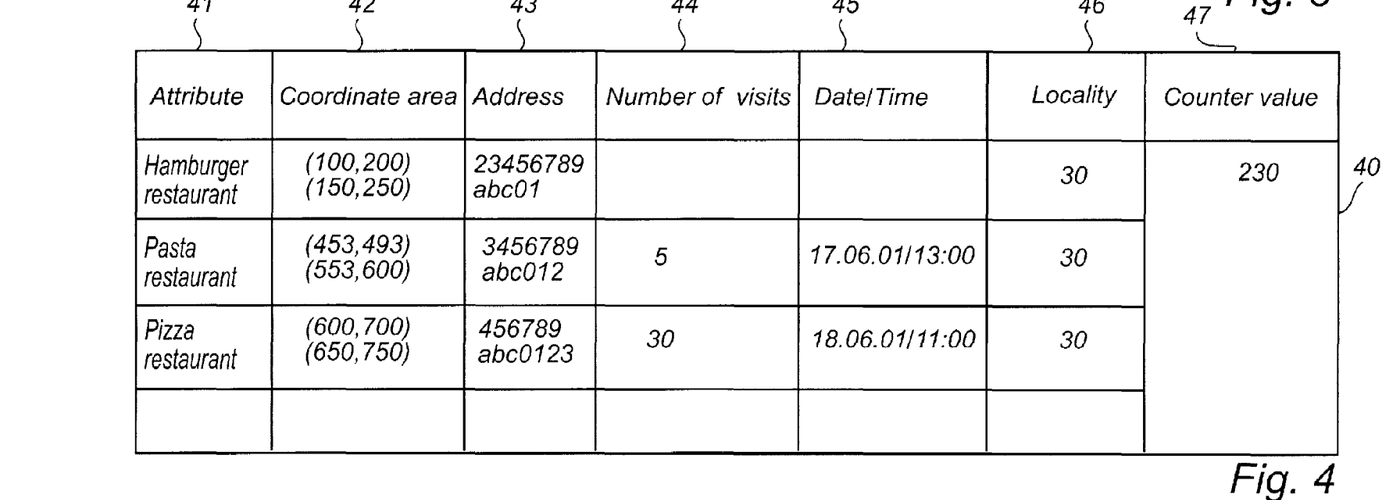
FIG. 4 shows schematically the data structure of a second address list in a server unit according to an embodiment of the invention.

The server unit receives orders and processes them in a way determined by the restaurant. Each server unit also comprises a second address list 40, the data structure of which can, for example, be as shown in FIG. 4. The second address list 40 is stored in the hamburger restaurant's server unit 5 (FIG. 1). The data structure in the other server units 6, 7 and 8 in this embodiment have a similar appearance but with different content. The second address list 40 has, just like the first address list, a "help" column 41 which is only for the purpose of illustration and to make it easier for the reader to understand. This column 41 comprises the attribute that is associated with a particular coordinate area. The second address list 40 has a first column 42 for a rectangular coordinate area that is defined by two diagonal pairs of coordinates. This coordinate area is associated with a particular attribute, which in this example is a particular restaurant. In addition, the address list 40 has a second column 43, which comprises the address of the server unit for the particular restaurant with the particular attribute represented by the coordinate area. In the third column 44 of the second address list, there are statistics of how frequently the attribute in question has been used. The server unit's own address and coordinate area can also be stored in the second address list. The fourth column 45 of the second address list 40 gives the date/time of introduction or the date/time of the most recent updating of the number of visits. In the fifth column 46 of the second address list, there is information concerning the locality of the attributes. In the server unit, there is also information stored concerning how many times the server unit has updated its second address list from information from the first address list of a sensor device.

The second address list 40 may also have limited storage capacity and can therefore become full. If this occurs and an updating with a new attribute is required, one or more coordinate areas, that represent a particular restaurant with the least frequent occurrence and/or that were added or visited furthest back in time, are removed. The locality can also be used in connection with updating, for example by initially choosing to remove attributes in the address list that have a locality that is far away from the server unit in question.

To return to FIG. 1, an order is placed using the order form 2, by marking the area belonging to the required option using the pen point of the sensor device 1, while at the same time the sensor device 1 records an image of the position-code locally at the pen point and calculates coordinates for the partial area on the imaginary surface that corresponds to the option chosen. In order to place the order, the coordinates must be transferred from the sensor device 1 to the required server unit, which interprets the coordinates and thereby the order that was placed.

In order to be able to transfer the coordinates to a required server unit, it is necessary to connect the sensor device to the required server unit. According to a preferred embodiment of the present invention, the server units 5, 6, 7 and 8 are each provided with a short-range transceiver 4, for instance a radio transceiver according to the Bluetooth® standard (see www.bluethooth.com) or according to the WLAN standard. Other types of transceiver are also possible, such as, for example, infrared transceivers according to the IrDA standard (see www.irda.org). A corresponding transceiver 19 is arranged in the sensor device 1 and is thus used to connect the sensor device to the required server unit.

In the following example, the transceivers 4, 19 are assumed to be designed according to the Bluetooth® standard.

According to the Bluetooth standard IEEE802, each such transceiver has a unique address that is a 48-bit hexadecimal number, for example 0x0080371a11da. It is necessary for the transceiver 19 in the sensor device 1 to obtain the address of the transceiver 4 of the server unit in question. In total $2^{32}$ different addresses can be coded according to the standard. The address of a unit is used as a part of almost all transmitted data that is intended to be received by the unit. An address according to the Bluetooth® standard consists of a part that is company-specific and that is allocated to each company that is to provide products based on the standard. In addition, the address consists of a part that is product-specific and that is determined by the company that provides the product.

Now assume that a person with a personal sensor device 1 arrives in a town he has never visited before. Soon after his arrival he feels hungry and decides to visit a hamburger restaurant. When he enters the restaurant, he looks at the hamburger restaurant's order form 2, which in this case is a menu. He decides what he wants to eat, takes out his sensor device and uses this to record the required meal by bringing the sensor device 1 into contact with order form 2. The sensor device 1 records a pair of coordinates (150,225) and checks whether the recorded pair of coordinates is included in any coordinate area in the first address list 30 (FIG. 3). The coordinate area in which the recorded pair of coordinates is included is not to be found in its address list 30 and the sensor device 1 can therefore use an enquiry method in order to be able to connect to the required server unit, which in this case is the hamburger restaurant's server unit.

For this purpose, the sensor device 1 first sends out an enquiry signal to the effect of "I am here and I want to make contact with the server units that can interpret pairs of coordinates". All the units that are within range and that have an address according to the Bluetooth® standard receive this signal and check whether they have software that can interpret pairs of coordinates. These units can be server units or other sensor devices. In the following example, these units are server units. The server units in the locality that have the required software reply with an address and the fact that they have this software. The sensor device receives the addresses. Thereafter, the sensor device connects to the server units that have replied that they have the required software, one after the other.

For each server unit, it is checked whether this is the server unit that is associated with the recorded pair of coordinates (150, 225) or whether the recorded pair of coordinates is included in the server unit's address list. If the coordinate area within which the recorded pair of coordinates is located is to be found in the address list, the information concerning the coordinate area and the address is sent to the sensor device. The sensor device can now connect to the required server unit. If the pair of coordinates agrees with the pair of coordinates for the server unit in question, the order can be placed. The check whether the recorded pair of coordinates lies within a coordinate area can be carried out either by the sensor device or by the server unit.

Figure 5:
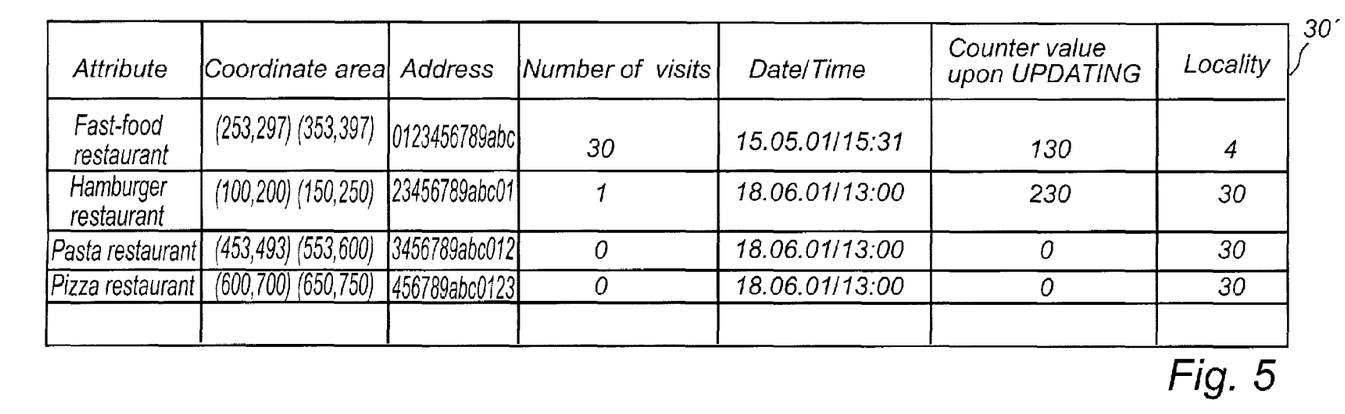
FIG. 5 shows schematically the data structure of the first address list in FIG. 3 after this has been updated by the method according to the present invention.

When the correct server unit 5 has been found, the sensor device also receives information concerning the server unit's address list. The sensor device uses the received information to update its own address list. In this case (see FIG. 4), the hamburger restaurant's address list 40 comprises coordinate areas that are associated with addresses for the pasta restaurant's server unit and the pizza restaurant's server unit. These coordinate areas are not included in the sensor device's address list 30, and the sensor device 1 therefore updates its address list 30 with these restaurants. The number of visits is set to 0 and the date and time of this update are noted in the thus updated address list 30', which is shown in FIG. 5. The locality of each server unit is noted and the value of the hamburger restaurant's counter for the number of updates is noted. The value of the counter is noted so that, in the event of any new connection to the hamburger restaurant, the sensor device will be able to determine whether the hamburger restaurant has updated its second address list since the previous connection. If many updates have been carried out, the sensor device should update its address list again from the hamburger restaurant's address list. If only a few updates have been carried out since the previous connection, the sensor device does not need to carry out a new update from the hamburger restaurant.

The server unit 5 also receives information about the sensor device's address list 30. This address list 30 contains a new restaurant, the fast-food restaurant. The server unit checks the locality of this attribute and finds that this is not in the vicinity of the server unit's own locality, as the sensor device normally is located in another town and then has a different locality. The hamburger restaurant's server unit therefore chooses not to update its address list with the fast-food restaurant from the server device's address list 30.

Figure 6:
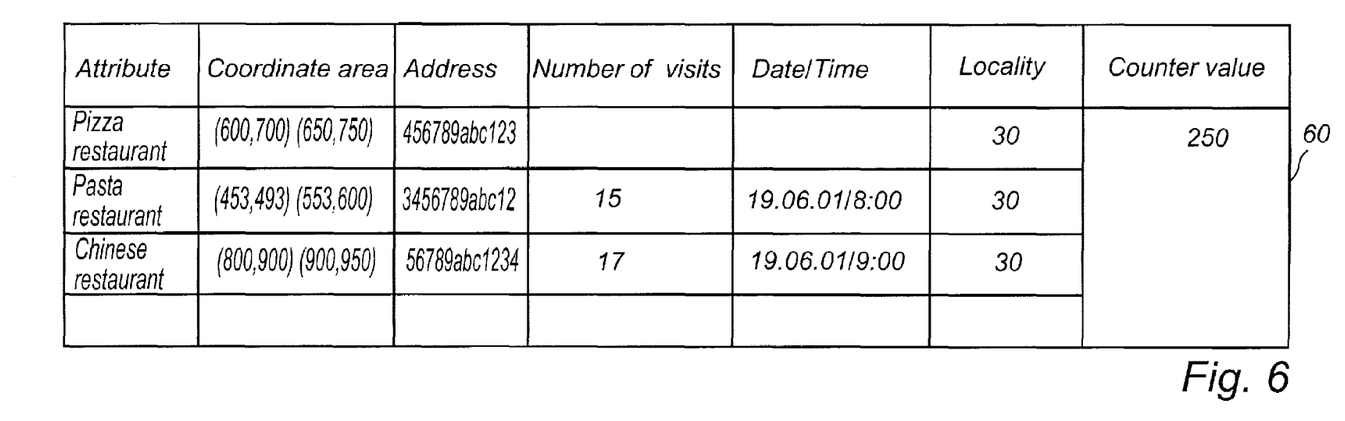
FIG. 6 shows schematically the data structure of a second address list in another server unit according to an embodiment of the invention.

The person with the sensor device 1 obtains his ordered hamburger. He stays in the same town and the next day visits the pizza restaurant with the server unit 6. He uses the sensor unit to record a pair of coordinates (630, 730) from the pizza restaurant's order form. The sensor device 1 checks whether the recorded pair of coordinates is to be found within any coordinate area in the address list 30'. This time the required restaurant, that is the coordinate area, is to be found in the address list 30', as the sensor device was updated the day before with the information from the address list 40 in the hamburger restaurant's server unit. The sensor device 1 connects directly to the pizza restaurant's server unit 6, via the address "456789abc0123" that is associated with the found match. The order information can be transferred to the required server unit 6. The sensor device 1 updates its address list 30' with the address list 60 of the server unit 6, see FIG. 6. The sensor unit adds the attribute Chinese restaurant with associated information to its address list 30', as this was not previously to be found in the first address list. The server unit 6 updates its address list 60 with the hamburger restaurant, as this was not previously to be found and as this has the same locality.

The functionality of the sensor device described above for administering and updating its address list from the server unit's address list is implemented in the preferred embodiment by software that is stored in the program memory 16c and that, when executed, is read into the working memory 16b by the processor 16a.

Although a special embodiment of the invention has been described above, it will be obvious to those skilled in the art that many alternatives, modifications and variations can be achieved in the light of the above description. For example, a special part of the address (a "tag") can mean that a server unit is located within a particular region, and therefore this part can be used to determine the locality of each address and the associated attribute in an address list.

There are, of course, a large number of possible alternative or supplementary rules that can be used for updating the address lists and that can besides depend upon the wishes of the users.

A server unit's attribute is, of course, not limited to corresponding to a restaurant or a type of restaurant, but may, for example, correspond to the company or the shop that mediates or executes a service via the server unit, based on received data from the sensor device. The attribute may also correspond to the service itself. Thus, the attribute may also correspond to different kinds of technical equipment, such as printer, fax machine or computer.

It is also possible to let the sensor device update its address list from other sensor devices' address lists. The sensor device thus connects to another sensor device, after which they exchange information concerning each other's address lists.

The address list does not need to associate coordinate areas with addresses, but can instead contain a direct association between attributes and addresses. Consider, for example, the case of a position-coded base containing an option box marked "print". Upon recording at least one pair of coordinates within the coordinate area of the option box, the sensor device is programmed to search for a local printer. This can be carried out on the basis of the attribute "printer", "laser printer", etc, using the address lists as stated above. It should be recognized that the coding of the attribute in the address list can be of any type, for example a standardized character combination, and can be dependent upon what type of short-range communication technology is used.

The portable unit does not need to be a sensor device that reads coordinates, but can alternatively, for example, be a mobile telephone. A user can, for example, want to send a message from his mobile telephone via a local e-mail gateway. The mobile telephone has no information about the address of the local e-mail gateway, for which reason an enquiry method is carried out. The mobile telephone sends out an enquiry signal to the effect that "I am here and I am looking for the address of an e-mail gateway". A printer is the first to send out a signal in response to the enquiry signal. The printer contains an address list that comprises the address of, among other things, the local e-mail gateway. The printer's signal comprises information about the printer's address list. The mobile telephone receives the information about the address list and updates its own address list with this information. The mobile telephone has now the address of the local e-mail gateway in its address list and can send its message to the e-mail gateway, which in turn forwards the message. The user of the mobile telephone also decides to print the message and therefore wishes to connect to the local printer in order to be able to send his message to the printer. The address of the local printer is now to be found in the mobile telephone's address list. The mobile telephone can thus connect to the printer directly and transfer the message in order for it to be printed.

In another alternative embodiment, the portable unit has software that converts some kind of recorded input data, corresponding to a desired attribute, into a key, which represents the attribute in the address lists according to the invention. The key is then used as a starting point in the search of the address list in the portable unit. If the key is found in the address list, the portable unit can connect directly to a desired server unit via the address that in the address list is associated with the key. If the key is not to be found in the memory, an enquiry method can, for example, be carried out, either direct or indirect via the address list of a server unit, in order to find the correct server unit in this way. Input data to the software that generates a key can, for example, take the form of a pair of coordinates, a voice, or a character combination. If a pair of coordinates is used as input data, this can, for example, be recorded using the sensor device according to FIG. 2.

A portable unit can have several different addresses of server units with the same attributes. For example, the first address list can contain addresses of a number of printers in different local environments. The portable unit can, for example, be arranged to connect initially to the printer with the current locality to which it has been connected the most times or to the printer with the current locality to which the portable unit was most recently connected.

What I claim and desire to secure by Letters Patent is:

1. A method for connecting a portable unit to a particular server unit from among a plurality of server units, the portable unit comprising a first address list and the particular server unit comprising a second address list, the first and the second address lists including an attribute of at least one of said plurality of server units and an address of the at least one server unit, comprising the steps of:
    recording a required attribute of a server unit, by electronically recording, using the portable unit, on a base provided with a subset of a position-coding pattern that codes coordinates on an imaginary surface, a pair of coordinates in a first partial area from among a plurality of partial areas on the imaginary surface, which partial area is associated with the required attribute;
    searching for the recorded attribute in the first address list;
    if the recorded attribute is found in the first address list, connecting the portable unit to the required server unit via the address in the first address list that is associated with the recorded attribute;
    updating the second address list from the first address list; and
    updating the first address list from the second address list.

2. A method according to claim 1, in which the first address list includes statistics of the number of connections to a server unit with a particular attribute.

3. A method according to claim 1, in which the second address list includes statistics of the number of portable units that have been connected to the particular server unit and that have had the respective server unit's attribute in their address list.

4. A method according to claim 2, further comprising:
    using the statistics to select which addresses and associated attributes are to be removed from the first address list due to a shortage of space.

5. A method according to claim 1, in which the first address list includes information about the time of the most recent connection to a server unit with a particular attribute.

6. A method according to claim 5, further comprising:
    using the information concerning the time of the most recent connection to a server unit with a particular attribute to select which addresses and associated attributes in the first address list are to be removed due to a shortage of space.

7. A method according to claim 1, in which it is used for short-range communication.

8. A method according to claim 7, in which the addresses in the first and second address lists respectively are used to establish a short-range radio link.

9. A method according to claim 7, in which the addresses in the first and second address lists respectively are used to establish a short-range infra-red link.

10. A system comprising:
    at least one portable unit including a first address list; and
    a plurality of server units with unique addresses, said plurality of server units each including a second address list, and means for updating the particular server unit's second address list from the first address list when the portable unit is connected to a particular server unit;
    wherein the first and the second address lists include a parameter representing an attribute of at least one of said plurality of server units and the unique address of the at least one server unit; and
    wherein the at least one portable unit further includes
    means for updating the first address list from the particular server unit's second address list when the portable unit is connected to the particular server unit;
    means for determining a required attribute of a server unit, by electronically recording, on a base provided with a subset of a position-coding pattern that codes coordinates on an imaginary surface, a pair of coordinates from a first partial area among a plurality of partial areas on the imaginary surface, said first partial area being associated with the required attribute;
    means for searching for a parameter representing the required attribute in the first address list; and
    means for connecting the portable unit to the required server unit via the address associated with the parameter representing the required attribute in the first address list, if the parameter representing the recorded attribute is found in the first address list.

11. A computer readable medium having stored thereon computer executable instructions, said instructions computer system to:
    determine a required attribute of a server unit, by electronically recording, using a portable unit, on a base provided with a subset of a position-coding pattern that codes coordinates on an imaginary surface, a pair of coordinates from a first partial area among a plurality of partial areas on the imaginary surface, said first partial area being associated with the required attribute;
    search for a parameter representing the required attribute in a first address list stored in the portable unit; and
    connect the portable unit to a required server unit via an address associated with the parameter representing the required attribute in the first address list, if the parameter representing the recorded attribute is found in the first address list;
    update a second address list stored in the required server unit from the first address list in the portable unit; and
    update the first address list in the portable unit from the second address list, wherein the first and second address list include a parameter representing an attribute of at least one of a plurality of server units and an address of the at least one server unit.

12. A portable unit comprising:
    a first address list that includes a parameter representing an attribute of at least one server unit and an address of the at least one server unit;
    means for determining a required attribute of a server unit, by electronically recording, on a base provided with a subset of a position-coding pattern that codes coordinates on an imaginary surface, a pair of coordinates from a first partial area among a plurality of partial areas on the imaginary surface, said first partial area being associated with the required attribute;
    means for searching for a parameter representing the recorded attribute in the first address list;
    means for connecting the portable unit to the required server unit via the address associated with the parameter representing the required attribute in the first address list, if the parameter representing the recorded attribute is found in the first address list;
    means for updating the first address list from second address list in the required server unit, and
    means for making it possible for the required server unit to obtain information from the first address list.

13. A method for connecting a portable unit to a particular server unit from among a plurality of server units, the portable unit comprising a first address list and the particular server unit comprising a second address list, the first and the second address lists including a parameter representing an attribute of at least one of said plurality of server units and an address of the at least one server unit, comprising the steps of;

recording a parameter associated with a required attribute of a server unit, by electronically recording, using the portable unit, from a base provided with a subset of a position-coding pattern that codes coordinates on an imaginary surface, a pair of coordinates in a first partial area from among a plurality of partial areas on the imaginary surface, the first partial area being associated with the required attribute;

searching for the recorded parameter in the first address list;

if the recorded parameter is found in the first address list, connecting the portable unit to the required server unit via the address associated with the recorded parameter in the first address list;

updating the second address list from the first address list; and     updating the first address list from the second address list.

\* \* \* \* \*